2,890,248
PREPARATION OF α-CHLOROCYCLOOCTANONE OXIME

Louis E. Craig, Pryor, Okla., assignor to General Aniline & Film Corporation, New York, N.Y., a corporation of Delaware No Drawing. Application September 21, 1956
Serial No. 611,374

1 Claim. (Cl. 260—566)

This invention relates to the preparation of α-chlorocyclooctanone oxime, and relates more particularly to a novel process for preparing α-chlorocyclooctanone oxime involving the addition of nitrosyl chloride to cyclooctene.

The addition of nitrosyl chloride to olefins has been described extensively throughout the chemical literature. The crystalline derivatives so obtained have been used extensively in separation and characterization of the terpenes. A wide variety of olefins have been converted to these crystalline derivatives, generally called "nitroso chlorides." The crystalline derivatives obtained by adding nitrosyl chloride to olefins are dimers. Wallach (Ann. 332, 305 (1904)) showed that the nitrosyl chloride addition products with terpenes were dimeric and wrote the structure as follows:

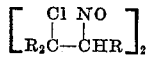

Very little has been done to elucidate the structure of these dimers. Crowder, Kise and Nesty (U.S. Patent No. 2,394,430) suggested the following structure for the nitrosyl chloride addition product of isobutylene:

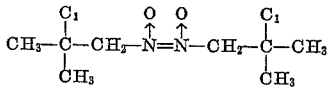

The addition of nitrosyl chloride to styrene and to cyclohexene resulted in crystalline products were shown to be dimers through infrared spectrum.

I have found that an oxime and not a dimer is formed by adding nitrosyl chloride to cyclooctene under certain conditions. Thus, I have discovered that α-chlorocyclooctanone oxime is formed by adding nitrosyl chloride to cyclooctene by slowly passing the nitrosyl chloride into a cooled solution of cyclooctene in an inert solvent. The crystalline material obtained had a melting point of 98° C. and the following structure:

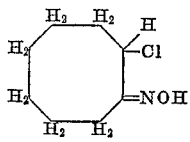

The structure of this was proved by elemental analyses, infrared spectrum (which showed absorption typical of —OH and —C=N—), and conversion by treatment with piperidine to α-piperidinocyclooctanone oxime, the structure

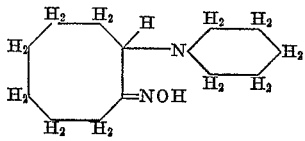

of which also was proved by elemental analyses and infrered spectrum (again showing absorption typical of —OH and —C=N—).

In a preferred method α-chlorocyclooctanone oxime is prepared by passing nitrosyl chloride into a solution of cyclooctene in an inert solvent in an ice-salt bath at 0° C. or below. Since the reaction is exothermic the nitrosyl chloride should be added slowly and the reaction mixture should be maintained at a temperature between —5° and 0° C. After the addition is complete, the resulting solution is stirred for from 1 to 5 hours at temperatures ranging from —15° C. to room temperature.

Inert solvents which are useful in the process of my invention are chloroform, acetic acid, low boiling petroleum ether, tetrahydrofuran, methylene chloride, ethyl ether, dioxane, ethyl acetate, acetone, benzene, nitromethane, and the like. However, optimum results are obtained by the use of chloroform or low boiling petroleum ether.

The following examples, which are illustrative only, give further details of the preparation of α-chlorocyclooctanone oxime in accordance with my invention; the parts are by weight:

Example I

To a stirred solution of 24 parts of cyclooctene in 110 parts of chloroform cooled in an ice-salt bath at —15° to —10° C. was added slowly a solution of 14 parts of nitrosyl chloride in 30 parts of chloroform. The temperature was kept below —5° C. during the addition. The resulting deep green solution was stirred for one hour and allowed to warm up to room temperature. A stream of nitrogen was bubbled through the solution to remove any unreacted nitrosyl chloride. Chloroform was removed under reduced pressure until the volume was reduced to about one-fourth of the original, and the residue chilled in an ice bath. The solid which separated was collected and washed with a little cold 75% ethanol. The solid amounted to 17.4 parts. It had a very faint greenish color and melted at 94 to 96° C. Recrystallization from hexane containing a little chloroform gave tiny colorless needles melting sharply at 98°.

The following analytical results were obtained on this material: C, 54.69%; H, 7.95%; N, 7.81%; mol. wt., 183, 184. Calculated for α-chlorocyclooctanone oxime ($C_8H_{14}ClNO$): C, 54.70%; H, 8.03%; N, 7.98%; mol. wt., 176.

Example II

To a stirred solution of 25 parts of cyclooctene in 25 parts of low boiling petroleum ether was added a cooled solution of 18 parts of nitrosyl chloride in 25 parts of low boiling petroleum ether. The temperature was maintained at —5° to 0° C. during the addition and stirred for one hour at about —15° C. after addition was complete. The white solid which had separated as the nitrosyl chloride was added was collected and washed with a little cold solvent. 14 parts of α-chlorocyclooctanone oxime were obtained. Reduction in volume of the mother liquor and cooling gave another 6 parts of product.

Example III

To a solution of 22 parts of cyclooctene in 50 parts of tetrahydrofuran stirred at —10° to —5° C. was added 16 parts of liquid nitrosyl chloride from a dry-ice-cooled dropping funnel. The resulting green solution was stirred for one hour at —10° to —5° C. after addition was complete and for four hours at room temperature. The green solution contained 8 parts of α-chlorocyclooctanone oxime as shown by converting an aliquot of the solution to α-piperidinocyclooctanone oxime by treatment with piperidine.

Example IV

To a solution of 25 parts of cyclooctene in 20 parts of acetic acid at about 0° C. was added a cooled solution of 16 parts of nitrosyl chloride in 20 parts of acetic acid. The deep green solution was stirred for 3 hours. Only a small amount of solid separated. The product was isolated by pouring the acetic acid solution into 500 parts of water and treating the resulting green oil with low boiling petroleum ether. 10.6 parts of α-chlorocyclooctanone oxime were obtained.

The α-chlorocyclooctanone oxime produced in accordance with my invention is a valuable chemical intermediate in the synthesis of other cyclooctane derivatives. Thus, the α-chlorocyclooctanone oxime may be converted by hydrolysis to α-chlorooctanone, by dehydrochlorination to α-chlorooctanone oxime which can be converted by hydrogenation and hydrolysis to cyclooctanone or by hydrogenation to cyclooctylamine, the latter being also obtained by the reduction of α-chlorocyclooctanone oxime. Moreover, as is described in my application Ser. No. 611,349, filed on even date herewith, the α-chlorocyclooctanone oxime may be converted by reduction to cyclooctylamine.

Furthermore, the chlorine of the α-chlorocyclooctanone oxime may be replaced by other radicals, such as —CN, —SO$_3$Na, —OR, —OCOR and the like. Reduction of oxime group in the resulting compounds would give rise to a number of substituted cyclooctylamines which would be difficult to prepare in any other manner.

It is to be understood that the foregoing detailed description is given merely by way of illustration and that many variations may be made therein without departing from the spirit of my invention.

Having described my invention what I desire to secure by Letters Patent is:

Process for the preparation of the monomeric α-chlorocyclooctanone oxime, which comprises adding with stirring a solution of nitrosyl chloride in an inert organic solvent, selected from the group consisting of chloroform and low boiling petroleum ether, to a solution of cyclooctene in an inert organic solvent, selected from the group consisting of chloroform and low boiling petroleum ether, at a temperature of —15° to —10° C. and maintaining the temperature of the mixture at about —5° C. during the addition, stirring the mixture, chilling the residue in an ice bath whereby the monomeric α-chlorocyclooctanone oxime formed is precipitated, and removing the solid precipitate from the mixture.

References Cited in the file of this patent

UNITED STATES PATENTS 2,371,418    Beckham et al. _____ Mar. 13, 1945

OTHER REFERENCES

Yakubovich et al.: vol. 44 Chem. Abst., p. 1011 (1950).

Tuot: Comp. rend., vol. 204, pp. 697–9 (1937).